(12) United States Patent
Amarakoon et al.

(10) Patent No.: US 7,777,921 B2
(45) Date of Patent: Aug. 17, 2010

(54) DIGITAL SCANNING CONTROL METHOD AND SYSTEM

(75) Inventors: Kiri Amarakoon, Pittsford, NY (US);
Cyril Edmunds, Webster, NY (US);
Roger Triplett, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1018 days.

(21) Appl. No.: 11/496,311

(22) Filed: Jul. 31, 2006

(65) Prior Publication Data

US 2008/0030806 A1    Feb. 7, 2008

(51) Int. Cl.
*H04N 1/04*    (2006.01)

(52) U.S. Cl. .................. 358/474; 358/486; 358/505; 358/1.9; 358/518; 358/1.5; 382/167; 382/173; 382/318; 399/83; 399/366

(58) Field of Classification Search .............. 358/474, 358/486, 497, 496, 1.9, 409, 406, 411, 500, 358/501, 410, 505, 527, 518, 516; 382/173, 382/168, 179, 318, 319, 157, 274, 275; 399/83, 399/366, 341
See application file for complete search history.

(56) References Cited

U.S. PATENT DOCUMENTS

| | | | |
|---|---|---|---|
| 4,709,147 A * | 11/1987 | Arai .................. 250/234 |
| 5,031,032 A | 7/1991 | Perregaux et al. |
| 5,430,536 A | 7/1995 | Fullerton et al. |
| 5,473,513 A | 12/1995 | Quinn |
| 5,545,913 A | 8/1996 | Quinn et al. |
| 5,552,828 A | 9/1996 | Perregaux |
| 5,604,362 A | 2/1997 | Jedlicka et al. |
| 5,691,760 A | 11/1997 | Hosier et al. |
| 5,748,344 A | 5/1998 | Rees |
| 5,750,985 A * | 5/1998 | Suzuki ............... 250/234 |
| 5,943,139 A * | 8/1999 | Tang et al. ........... 358/412 |
| 6,253,986 B1 * | 7/2001 | Brofman et al. ...... 228/56.3 |
| 6,330,083 B1 * | 12/2001 | Nabeshima et al. .... 358/474 |
| 6,567,170 B2 | 5/2003 | Tandon et al. |
| 6,621,576 B2 | 9/2003 | Tandon et al. |
| 6,647,144 B2 | 11/2003 | Williams et al. |
| 6,650,436 B1 * | 11/2003 | Hamamoto et al. ..... 358/1.9 |
| 6,771,397 B2 * | 8/2004 | Hashizume ........... 358/474 |
| 6,788,438 B2 * | 9/2004 | Takahashi et al. ..... 358/483 |
| 6,937,364 B2 * | 8/2005 | Suzuki ................ 358/1.9 |
| 6,975,949 B2 | 12/2005 | Mestha et al. |
| 7,002,709 B1 * | 2/2006 | Terada et al. ........ 358/3.28 |
| 7,006,260 B2 * | 2/2006 | Sato et al. ........... 358/448 |
| 7,248,272 B2 * | 7/2007 | Harada et al. ........ 347/116 |
| 7,262,885 B2 * | 8/2007 | Yao .................... 358/3.06 |
| 7,327,502 B2 * | 2/2008 | Sheng ................. 358/498 |
| 2001/0035985 A1 * | 11/2001 | Takahashi et al. ..... 358/471 |
| 2003/0098985 A1 | 5/2003 | Horobin |
| 2004/0246544 A1 | 12/2004 | Hosier et al. |

(Continued)

*Primary Examiner*—Negussie Worku
(74) *Attorney, Agent, or Firm*—Fay Sharpe LLP (57) ABSTRACT

Signals from a color (multi-row) full width array sensor are used to detect and correct for motion quality issues in a constant velocity transport or platen document scanner. This capitalizes on the geometry of the full width array sensor, in which three or four rows of photo sites are arranged in the slow scan direction. For example, the arrival time of an image edge of the red sensor row may be compared to the slightly later arrival time at the blue sensor row, and the difference yields the velocity. The velocity can then be fed back to control the transport.

10 Claims, 5 Drawing Sheets

U.S. PATENT DOCUMENTS

| | | |
|---|---|---|
| 2005/0265625 A1 | 12/2005 | Li et al. |
| 2005/0275860 A1 | 12/2005 | Nagarajan et al. |
| 2008/0030806 A1* | 2/2008 | Amarakoon et al. ......... 358/486 |
| 2008/0165378 A1* | 7/2008 | Barry et al. .................. 358/1.9 |

* cited by examiner

DIGITAL SCANNING CONTROL METHOD AND SYSTEM

BACKGROUND

The present exemplary embodiment relates generally to a method and system for document processing. More specifically, the present exemplary embodiment relates to a digital scanning velocity control method and system.

Digital copiers are well known. Whereas a traditional "analog" copier in effect directly takes a photograph of the image desired to be copied, in a digital copier, an original image on an input sheet is recorded as digital data, and the digital data is used to create a print which is a copy of the original image. The original image is typically recorded by an array of photosensors, such as in a charge-coupled-device (CCD), while the printing step is typically carried out by familiar "ink-jet" technology, or by digital "laser printer" rendering in a xerographic apparatus.

Between the recording of the original image and the output of a resulting print, the image data can be processed and manipulated, such as through digital image processing, in any number of ways. Chief among these ways is alteration of the placement of the image relative to a print sheet on which the image is ultimately rendered: the placement of the image further involves consideration of hardware-related factors such as the start-of-scan control in a scanning laser which creates a latent image on a photoreceptor in a xerographic printer, or the precise control of a moving printhead in an ink-jet apparatus. Another aspect of processing image data between recording and printing relates to the magnification of the image.

Ideally, in a basic case, it is desirable that a copy output by a digital copier be as similar to the original image as possible, particularly in the aspects of placement of the image relative to the edge of the print sheet, as well as magnification of the printed image relative to the original. In a conventional digital reproduction device, a document or image is scanned by a digital scanner, which converts the light reflected from the document into electrical charges representing the light intensity from predetermined areas (or pixels) of the document. The pixels of image data are processed by an image processing system, which converts the pixels of image data into signals that can be utilized by the digital reproduction machine to recreate the scanned image. In other words, the image processing system provides the transfer function between the light reflected from the document to the mark on the recording medium.

Image sensor arrays typically comprise a linear array of photosensors, which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, one design includes an array of photosensors of a width comparable to the width of a page being scanned, to permit one-to-one imaging generally without the use of reductive optics. In order to provide such a "full-width" array, however, relatively large silicon structures must be used to define the large number of photosensors. A preferred technique to create such a large array is to align several butted silicon chips, each chip defining a small linear array thereon. In one design, for example, an array is intended to comprise up to twenty silicon chips, butted end-to-end, with each chip having 372 active photosensors spaced at 600 photosensors per inch.

One measure of the performance of a reproduction machine is how well the copy matches the original. With respect to input imaging terminals using constant velocity document transports or platen scanning devices, the scanning velocity is critical to high quality image reproduction. Many current implementations, however, may create velocity errors that lead to image quality defects, since the imaging sensor to paper speed cannot be guaranteed.

Therefore, it is desirable to utilize a system and method for detecting and correcting motion quality issues associated with digital scanners.

BRIEF DESCRIPTION

In accordance with an aspect of the exemplary embodiment, a method of controlling the velocity of a digital scanning unit associated with an image processing unit is provided. The method comprises: capturing a color scan of a document in real time via an image sensing unit; determining whether a given pixel in the color scan is white, on an object or on an edge; calculating the edge in equivalent time, where the given pixel is on an edge; determining the elapsed time between two colors; calculating the instantaneous document velocity; comparing the instantaneous document velocity to a pre-determined document velocity; and adjusting the velocity of the digital scanning unit based upon the difference between the instantaneous document velocity and the pre-determined document velocity.

In accordance with another aspect of the exemplary embodiment, an image processing system is also provided. The system comprises: an image processing unit; a motion control system; and a digital scanner operative to: capture a color scan of a document in real time via an image sensing unit; determine whether a given pixel in the color scan is white, on an object or on an edge; calculate the edge in equivalent time, where the given pixel is on an edge; determine the elapsed time between two colors; calculate the instantaneous document velocity; compare the instantaneous document velocity to a pre-determined document velocity; and adjust the velocity of the digital scanner via the motion control system based upon the difference between the instantaneous document velocity and the pre-determined document velocity.

DETAILED DESCRIPTION

For a general understanding of the exemplary embodiment, reference is made to the drawings. In the drawings, like reference numerals have been used throughout to designate identical elements. In describing the exemplary embodiment, the following terms have been used in the description.

An "image" is a pattern of physical light. To "render" or "print" a color image is to mark a substrate with at least two and preferably three or more colorants (e.g., inks, toners, pigments, etc.) so as to form a full color image from the visual integration of the colorants.

A "pixel" is the smallest segment into which an image is divided in a given system. Each pixel value is a bit in a "binary form" of an image, a gray scale value in a "gray scale form" of an image, or a set of color space coordinates in a "color coordinate form" of an image, the binary form, gray scale form, and color coordinate form each being a two-dimensional array defining an image.

The term "white" is used herein to describe the signal from the document sheet or substrate, regardless whether it is visually white. Some sheets may be cream colored or other named color. However, "white" will be used to describe any signal as sensing from regions of the bare sheet.

The term "image reproduction apparatus" or "printer" as used herein broadly encompasses various printers, scanners, copiers or multifunction machines or systems, xerographic, ink jet, solid ink, lithographic, electrophotographic or otherwise. The term "sheet" herein refers to a usually flimsy physical sheet of paper, plastic, or other suitable physical substrate for images, whether precut or web fed.

Figure 1:
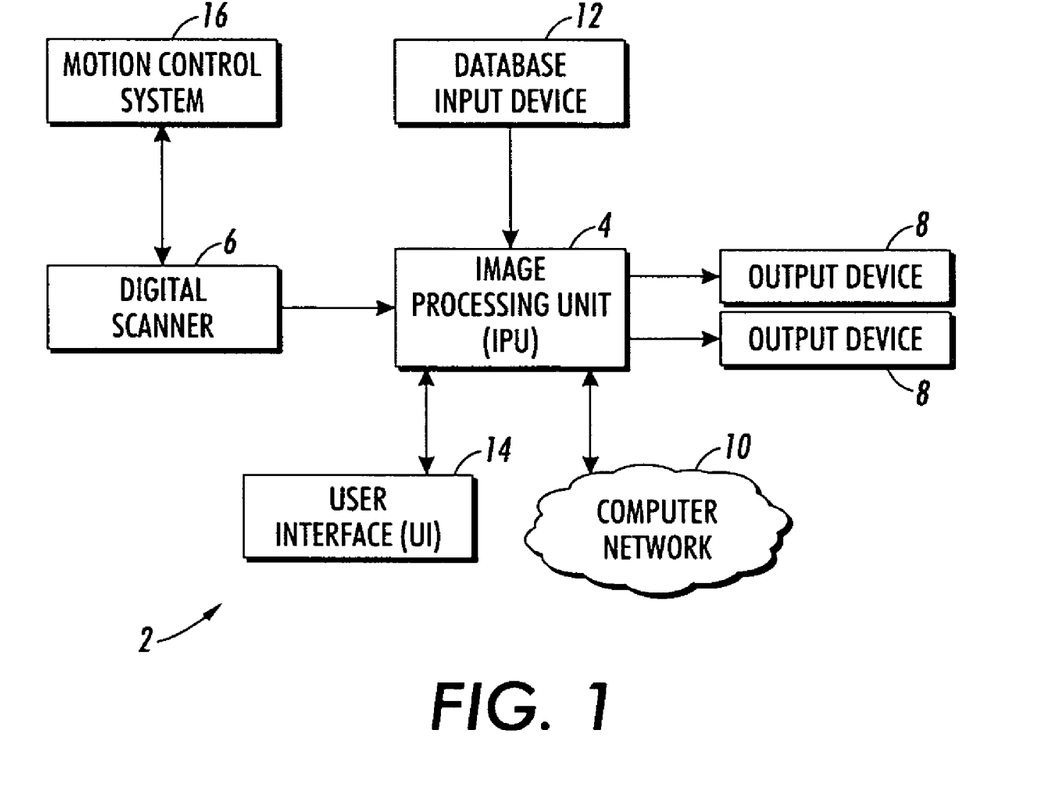
FIG. 1 diagrammatically illustrates a digital image processing apparatus formed in accordance with the exemplary embodiment.

Referring now to the drawings, FIG. 1 diagrammatically illustrates an image reproduction apparatus 2 for implementing the method and comprising an apparatus in accordance with the exemplary embodiment. The digital image processing apparatus 2 formed in accordance with the exemplary embodiment comprises an image processing unit (IPU) 4 for performing digital image processing and other electronic computational operations. The IPU 4 is operably coupled to a digital image scanner 6 that receives an image as input and derives digital image data representative of the image as is well understood in the art. The term "scanner" as used herein is intended to encompass all devices that receive image data and derive digital image data therefrom. Examples of scanners include document scanners that receive printed images as input and digital cameras that receive optical images as input. The IPU 4 receives the digital image data from the scanner 6 as input.

The IPU 4 is also operably coupled to one or more output devices 8 that receive digital image data from the IPU 4. The image output device(s) 8 can comprise a digital data storage device that stores the digital image data for later retrieval (e.g., CD-ROM, magnetic media, or other storage medium), a video display terminal that generates a visual image based upon the digital image data, and/or a printer that generates a "hard copy" printed image based upon the digital image data.

As illustrated herein, the IPU 4 is optionally connected to a computer network 10 such as a local area network, a wide area network, and/or a global computer network such as the internet. As such, the IPU 4 can send digital image data to and receive digital image data from any network(s) to which it is connected.

The IPU 4 is also operably coupled to a digital image database input device 12. This digital image database input device 12 can be a simple fixed magnetic disk drive and/or removable magnetic disk, an optical media reader (e.g., a CD-ROM input device) that receives an optical storage medium, and/or any other suitable digital image data storage device that includes and/or is adapted to receive and read a digital image storage medium.

The apparatus of FIG. 1 further comprises a user interface (UI) 14 operably coupled to the IPU 4. The UI 14, which comprises any suitable input/output device, is used by a user to receive information from and input information to the image processing unit. Suitable user interface devices include keyboards/keypads, mechanical buttons/switches, video display terminals with graphical user interfaces, pointing devices such as a joystick or mouse, voice command input devices, touch screens and/or any other suitable input/output device by which a user can receive information from and input information to the IPU 4.

Those of ordinary skill in the art will recognize that it is possible for some overlap to exist in connection with the UI 14 and output device(s) 8. For example, a video display terminal or screen of the output device 8 can also be part of the UI 14 and provide visual information to the user.

The disclosed digital scanner 6 may be operated and controlled by appropriate operation of one or more conventional motion control systems 16. It is well known to program and execute such control functions and logic with software instructions for conventional or general purpose microprocessors, as taught by numerous prior patents and commercial products. Such programming or software may of course vary depending on the particular functions, software type, and microprocessor or other computer system utilized, but will be available to, or readily programmable without undue experimentation from, functional descriptions, such as those provided herein, in the cited prior patents and applications herein, and/or prior knowledge of functions which are conventional, together with general knowledge in the software or computer arts. Alternatively, the disclosed control systems or methods may be implemented partially or fully in hardware, using standard logic circuits or single chip VLSI designs.

Those of ordinary skill in the art will also recognize that an apparatus formed in accordance with FIG. 1, including the IPU 4 can be provided by a wide variety of known systems. For example, the apparatus 2 of FIG. 1 can be provided by a xerographic or electrophotographic digital image reproduction apparatus (i.e., a digital copier).

Figure 2:
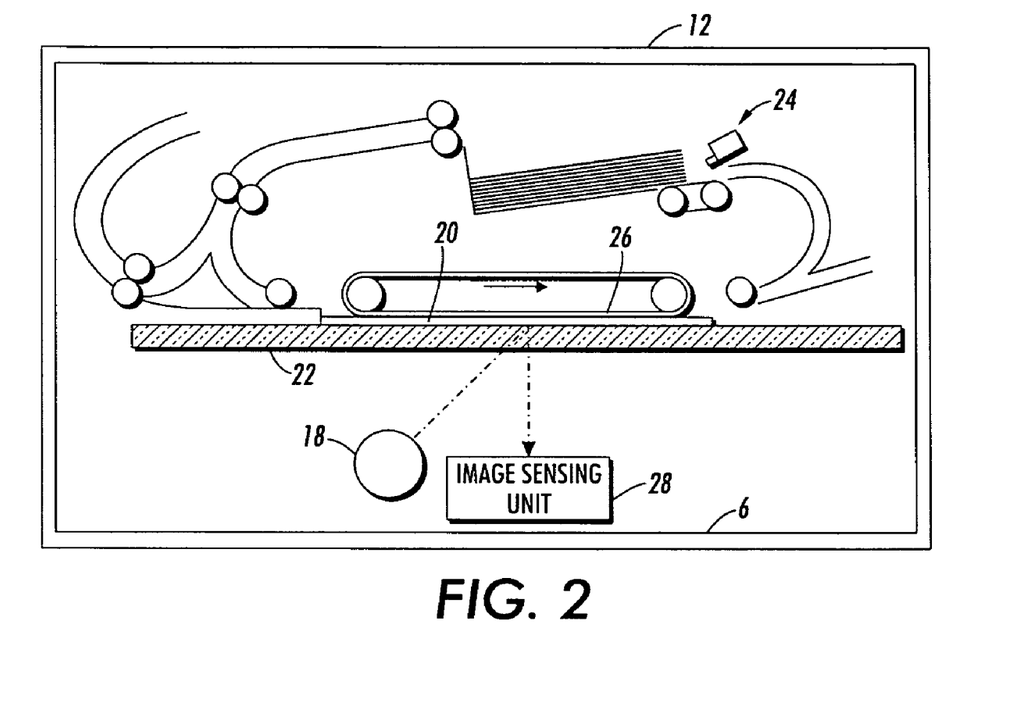
FIG. 2 is a diagram illustrating components of the digital scanning unit.

FIG. 2 illustrates the digital scanning unit (or "scanner") 6, showing the essential components thereof relevant to the exemplary embodiment. In particular, a light source 18 is used to illuminate a hardcopy original document 20 to be scanned. In a platen-type scanning situation, the document 20 usually rests upon a glass platen 22, which supports the document 20 for scanning purposes. The document 20 may be placed on the glass platen 22 by an operator. Alternatively, the scanning unit 6 may include a feeder or document handler 24, which places the document 20 on the glass 22. An example of such a feeder 24 is shown in U.S. Pat. No. 5,430,536, which is hereby incorporated by reference in its entirety.

On top of the glass platen 22 and the document 20, a backdrop portion (or platen cover) 26 is placed to prevent stray light from leaving the scanning area to provide a background from which an input document can be distinguished. The backdrop portion 26 may be part of document handler 24. The backdrop portion 26 is the surface or surfaces that can be scanned by an image sensing unit 28 when a document is or is not present in the scanning station. The light reflected from the document 20 passes through a lens subsystem (shown as 36 in FIGS. 4 and 5) so that the reflected light impinges upon the image sensing unit 28, such as a charge coupled device (CCD) array or a full width array.

The CCD or full width array typically comprises one or more linear arrays of photo-sites, wherein each linear array may be sensitive to one or more colors. In a color image capture device, the linear arrays of photo-sites are used to produce electrical signals which are converted to color image data representing the scanned document. However, in a black-and-white scanner, generally, only one linear array of photo-sites is used to produce the electrical signals that are converted to black and white image data representing the image of the scanned document. The image sensing unit 28 can be any type of electronic sensor including a charge coupled device (CCD) array or a full width array (or imaging bar).

Figure 3:
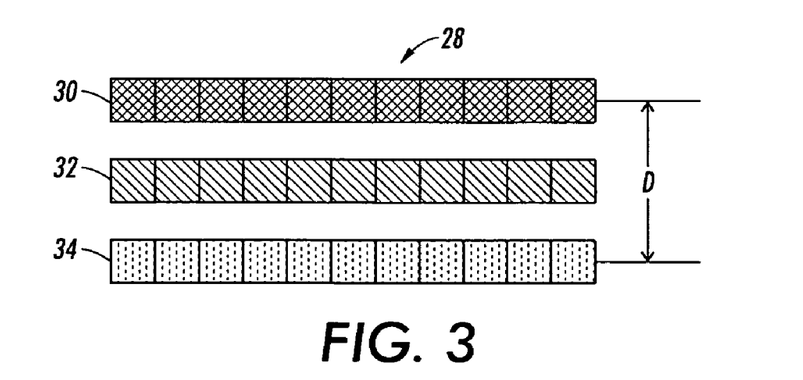
FIG. 3 is plan view of a portion of a full width array sensor.

Examples of full width arrays include those used in various document scanning systems of various well known Xerox Corporation commercial products (including some being alternatively used for black and white imaging) such as the Document Center 255DC products, or the Document Center Color Series 50 products. Examples of full width arrays that can be used in the image sensing unit 16 are disclosed in, for example, U.S. Pat. Nos. 5,473,513, 5,748,344, 5,552,828, 5,691,760, 5,031,032, 5,545,913, 5,604,362, and 6,621,576, all of which are hereby incorporated by reference in their entirety. As shown in FIG. 3, such full width arrays typically come already provided with at least three different color filters, such as red, green and blue, overlying three rows (30, 32, and 34) of closely spaced light sensor elements (photo-sites), to provide electrical output signals corresponding to the colors of the document image being scanned. The distance between the red row 30 and the blue row 34 is represented by the letter "D." Such imaging bars are typically formed by edge butting together a number of individual imaging chips, each having such multiple tiny and closely spaced photo-sites. Generally, there are three rows of such photo-sites on each such chip, as in the assembled imaging bar, with said integral filters for red, green and blue, respectively.

As noted in U.S. Pat. No. 6,621,576, for example, standard document imaging bars may be constructed from multiple individual chips, each having multiple very small and closely spaced photo-sites. Each such chip may be about 16 mm long. Current document scanners typically sense colors in terms of RGB coordinates, which approximate the human visual system. Usually, scanner characterization is needed to transform scanned RGB values (scanner output signals) to colorimetric (i.e. visual) signals. Thus, each such chip typically has three rows of such photo-sites manufactured with respective integral color filters for red, green and blue. The spectrophotometer described in said U.S. Pat. No. 6,621,576 uses such chips as photodetectors. Each said chip can read at a resolution of 400 SPI in the x-direction and 600 SPI in the y-direction, and provides 248 photosensitive cells, with a 63.5 micro-meter pitch between cells. The cells contain in-built integration hardware to accumulate photo-generated electrons and amplify the signals. Additional row(s) of such photo-sites or photocells may be added to these chips, for white light or other sensing. Data is collected from these image bar cells (photo-sites), whenever a target lighting source is sequentially illuminated. The photocells outputs are then processed using spectral reconstruction algorithms, such as those described in patents or applications cited herein, or therein, to produce reflectance spectral signals. The measured pixels can thus be in device independent quantity, and hence can be used across various media, inks or toner.

Figure 4:
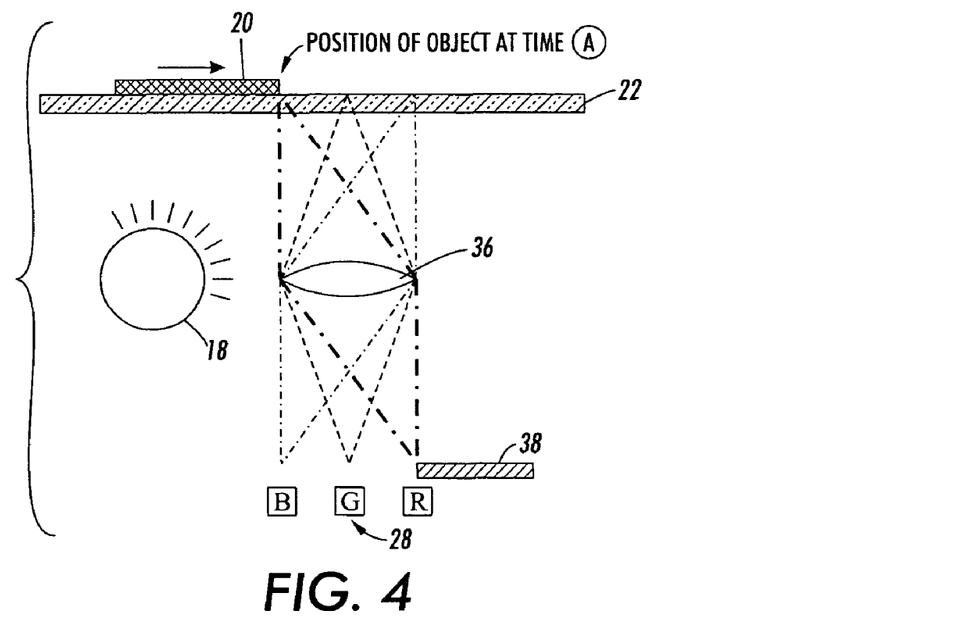
FIG. 4 is a schematic side view of an imaging system, shown scanning a printed sheet and obtaining a red signal at the instant in time when an edge is optically located above the red sensors.

Now, it is possible to use the first and last (i.e. the red and blue photo signals) to determine the elapsed time of a black-to-white transition on the document 8 as it passes over the image sensing unit 28, as shown in FIGS. 3 and 4. In this regard, the instantaneous document velocity may be determined by taking the distance between the red and blue photo sites and dividing the distance by the elapsed time.

The time available to determine the instantaneous document velocity is dependent on the scanning speed. For example, in some systems the document speed at 120 ppm is 540 millimeters per second. Therefore, the time taken for a black-to-white transition from the red row to the blue row would be 194 nanoseconds. This is well within the capability of detection of the digital scanner 6. Any deviation from this figure to the measured figure (i.e., the instantaneous document velocity) will be the velocity error of the paper.

FIG. 4 shows the image sensing unit 28 obtaining a red signal from the array at time zero. For this example, the object (i.e., the hardcopy original document 20) on the platen glass 22 consists of an edge between the white of the substrate and the black of the printed object. The illumination system 18 provides illumination to the object 20, and an optical imaging system 36 produces a real (or aerial) image 38 of the object 20 on the image sensing unit 28. At the instant in time when the motion of the scanning system 6 is frozen, the edge transition between white and black is precisely positioned such that the real image 38 of this edge transition is directly imaged on the red sensor (R) of the image sensing unit 28. A time sequence profile of this scanning motion is shown in FIG. 6 for the red sensor (R).

Figure 5:
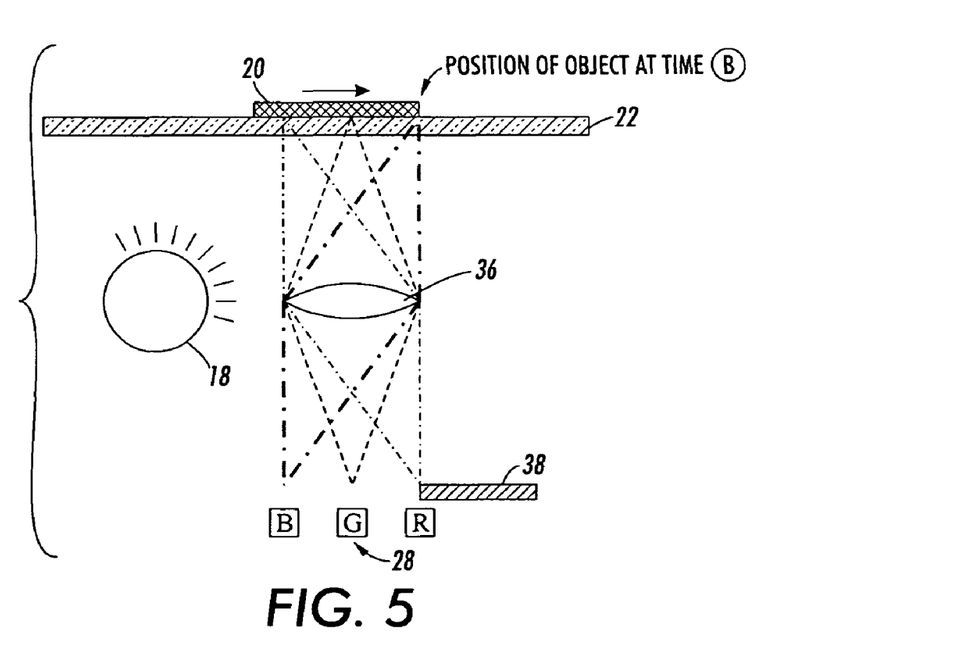
FIG. 5 is a schematic side view of an imaging system, shown scanning a printed sheet and obtaining a blue signal at the instant in time when an edge is optically located above the blue sensors.

FIG. 5 shows the image sensing unit 28 receiving a blue signal at a given time. Similar to FIG. 4, the illumination system 18 provides illumination to the object 20 and the optical imaging system 36 produces a real image 38 of the object 20 on the imaging sensing unit 28. At the instant in time when the motion of the scanning system 6 is frozen, the edge transition between white and black is precisely positioned such that the real image 38 of this edge transition is directly imaged on the blue sensor (B) of the image sensing unit 28. A time sequence profile of this scanning motion is shown in FIG. 5 for the blue sensor (B).

Figure 6:
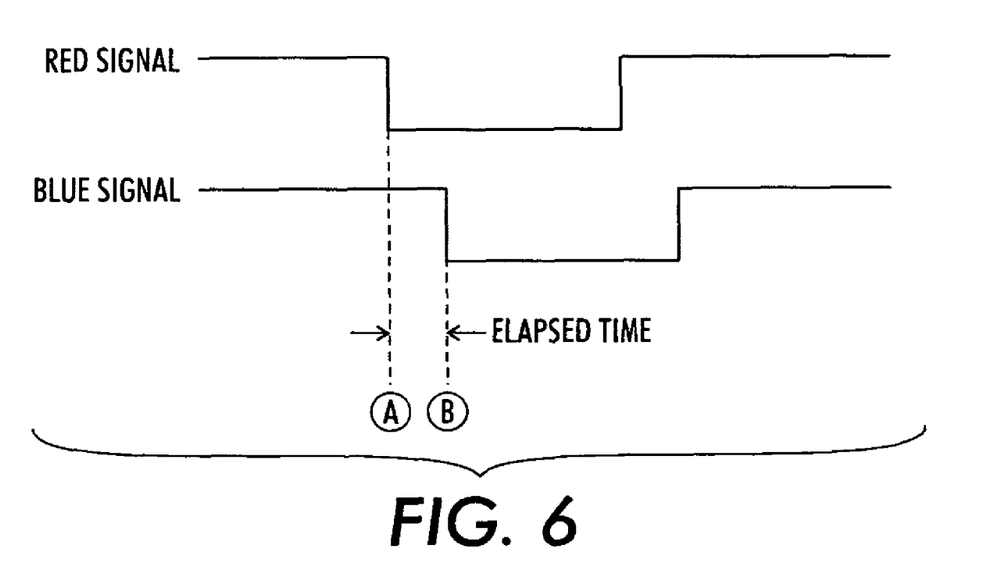
FIG. 6 is a chart showing the elapsed time between the red signal and the blue signal.

Thus, FIG. 6 shows the elapsed time between the red photo site and the blue photo site signals. The letter "A" refers to the instant in time when the object 20 is at the position shown in FIG. 4, while the letter "B" refers to the instant in time when the object 20 is at the position shown in FIG. 5. As stated earlier, the instantaneous document velocity is equal to the distance between the red photo site and the blue photo site divided by the elapsed time.

Figure 7:
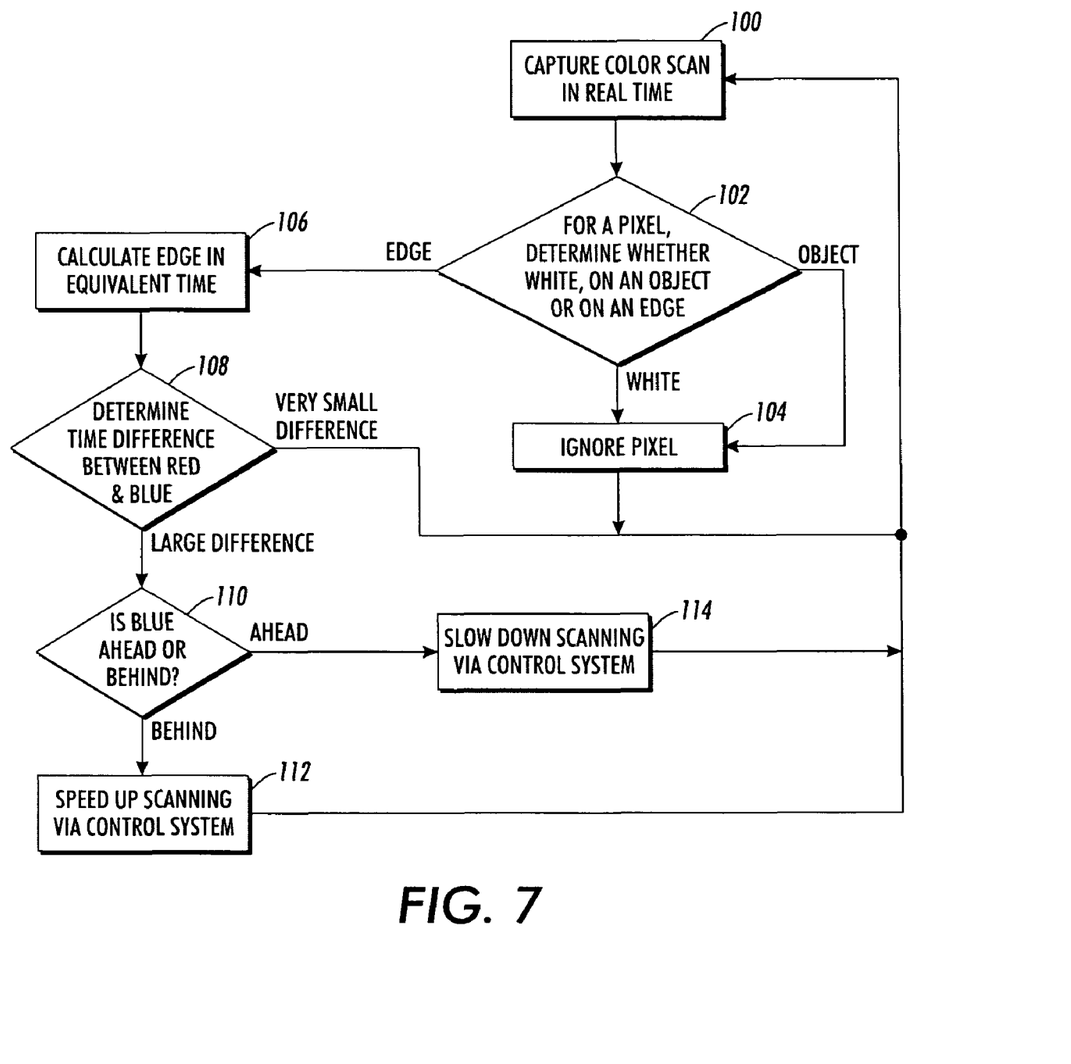
FIG. 7 is a flow chart illustrating an exemplary embodiment of a scanning velocity adjustment method.

The exemplary embodiment of the digital scanning control method is shown in FIG. 7. Initially a color scan of a printed image or document 20 is captured in real time by the digital scanning system 6 (100). This step (100) is typically carried out in connection with a user inputting the printed image 20 into the scanner 6, where the user wants to replicate the printed image 20. Then, for a given pixel, a determination is made as to whether it is white, on an object, or on an edge (102). If it is on a neutral object or if it is white, then the pixel is ignored (104). However, if it is on an edge, then a calculation of the precise time when the edge transition occurred for each color channel (red, green, and blue) is made (106). Next, the time difference between the red and blue signals is determined (108). The time difference between the red and blue signals is then used to determine whether the blue signal is ahead or behind the expected nominal time (110). That is, the instantaneous document velocity is calculated. If the blue signal is "ahead," then the scanning speed may be decreased via the motion control system 16 (112). However, if the blue signal is "behind," then the scanning speed may be increased via the control system 16 (114). Of course, it is to be understood that this process may be repeated as necessary in order to maintain the proper speed of the digital scanner 6.

The motion control system 16 generally includes a motor and drive electronics for controlling the velocity of the transport system 24 in FIG. 2. This would describe the document handler version. For the platen scanner version, the motion control system 16 generally includes a motor and mechanism to move the imaging module, which consists of the illumination system 18, the optical imaging system 36 and the image sensing unit 18.

Alternatively, it may be possible to use the gray level differences between red and blue, and, through a look-up-table stored in the database 12, for example, control the motion control system 16. This would allow full control, without ever calculating the actual time differences in real time. It would be pre-calculated and loaded into the look-up-table.

Thus, signals from the color (multi-row) full width array sensor are used to detect and correct for motion quality issues in a constant velocity transport or platen document scanner. The concept capitalizes on the unique geometry of the imaging sensor, in which three or four rows of photo sites are arranged in the slow scan direction. For example, the arrival time of an image edge of the red sensor row is compared to the slightly later arrival time at the blue sensor row, and the difference yields the velocity. The velocity can then be fed back to control the transport.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of controlling the velocity of a digital scanning unit associated with an image processing unit, the method comprising:
    capturing a color scan of a document in real time via an image sensing unit, wherein the document includes an edge between a white portion of the document and a colored portion of the document and the color scan of the document includes a plurality of pixels;
    determining whether a given pixel in the color scan is on the white portion, on the colored portion, or on the edge of the scanned document;
    where it is determined that a given pixel is on the edge, calculating a precise time when an edge transition occurred for each of three color signals;
    determining an elapsed time difference between a first and second color signal;
    using the elapsed time difference between the first and second color signals to calculate an instantaneous document velocity;
    comparing the instantaneous document velocity to a pre-determined document velocity to determine a difference between the instantaneous document velocity and the pre-determined document velocity; and
    adjusting the velocity of the digital scanning unit via a motion control system based upon the difference between the instantaneous document velocity and the pre-determined document velocity.

2. The method defined in claim 1, wherein the image reproduction apparatus comprises a xerographic, ink jet, solid ink, lithographic, or electrophotographic digital image reproduction apparatus.

3. The method defined in claim 1, wherein the image sensing unit comprises a full width array.

4. The method defined in claim 3, wherein the full width array includes three different color filters overlying three rows of light sensor elements, wherein the color filters comprise red, green and blue filters.

5. The method defined in claim 4, wherein the two colors used to determine the elapsed time are any two of the multiple rows of sensor signals.

6. An image processing system comprising:
    an image processing unit that performs digital image processing and electronic computational operations;
    a digital scanner coupled to the image processing unit, wherein the digital scanner is operative to:
        capture a color scan of a document in real time via an image sensing unit wherein the document includes an edge between a white portion of the document and a colored portion of the document and the color scan of the document includes a plurality of pixels;
        determine whether a given pixel in the color scan is on the white portion, on a colored portion, or on the edge of the scanned document;
        where it is determined that the given pixel is on the edge, calculate a precise time when an edge transition occurred for each of three color signals;
        determine an elapsed time difference between a first and second color signal;
        use the elapsed time difference between the first and second color signals to calculate an instantaneous document velocity;
        compare the instantaneous document velocity to a pre-determined document velocity to determine a difference between the instantaneous document velocity and the pre-determined document velocity; and
        adjust the velocity of the digital scanner via the motion control system based upon the difference between the instantaneous document velocity and the pre-determined document velocity;
    a motion control system that operates and controls the digital scanner.

7. The system defined in claim 6, wherein the image processing unit comprises a xerographic or electrophotographic digital image reproduction apparatus.

8. The system defined in claim 6, wherein the image sensing unit comprises a full width array.

9. The system defined in claim 8, wherein the full width array includes three different color filters overlying three rows of light sensor elements, wherein the color filters comprise red, green and blue filters.

10. The system defined in claim 9, wherein the two colors used to determine the elapsed time are any two of the multiple rows of sensor signals.

* * * * *